July 16, 1929.    O. A. K. PRINTZ    1,720,691
PLOW
Filed June 13, 1928
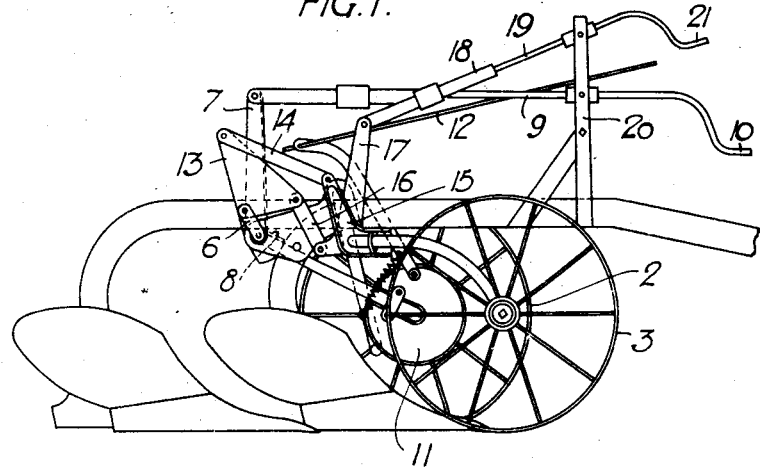
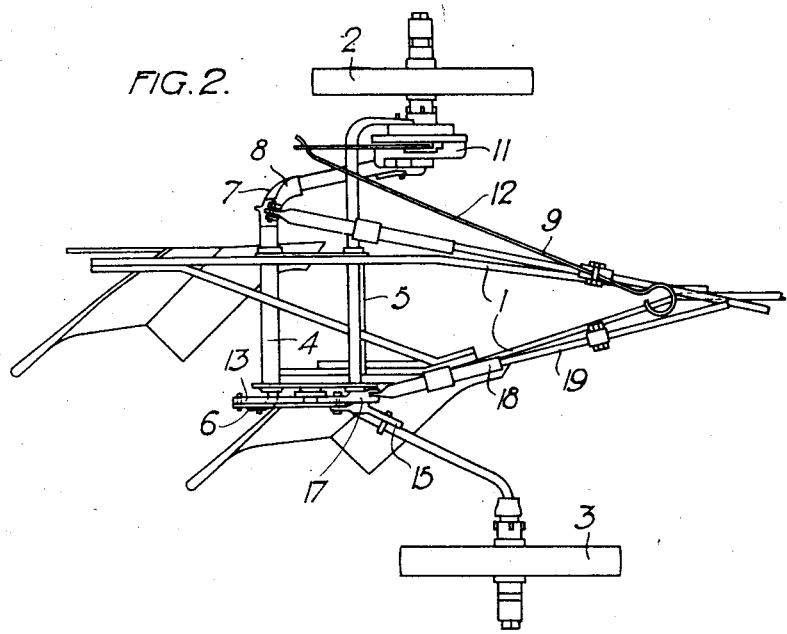
Inventor
Oscar A. K. Printz
By
Atty.

Patented July 16, 1929.

1,720,691

UNITED STATES PATENT OFFICE.

OSCAR ADOLF KRISTIAN PRINTZ, OF OVERUM, SWEDEN.

PLOW.

Application filed June 13, 1928, Serial No. 285,177, and in Sweden July 12, 1927.

This invention relates to tractor plows of the kind having two supporting wheels mounted on crank axles and particularly to that type of such plows which is provided with a mechanism to lift the plow bases out of engagement with the ground by power derived from one of the supporting wheels, a mechanism to adjust the depth of plowing, and a mechanism to raise or lower one side of the plow frame relatively to the other.

The object of the invention is to improve the said last-mentioned mechanism in order to make it more simple and compact than heretofore and more easy to operate.

With these and other objects in view, the invention consists in certain novel features of construction and combination of parts as hereinafter set forth and pointed out in the claims.

In the accompanying drawings, Fig. 1 is a side elevation of a plow structure embodying the invention, and Fig. 2 is a plan view of the same.

With reference to the drawing, the numeral 1 indicates the frame of the plow. Mounted in the frame are two crank axles 4 and 5 carrying the land wheel 2 and the furrow wheel 3, respectively. The axle 4 of the land wheel carries a crank arm 6 outside the frame upon its end remote from the land wheel. Freely mounted on the same axle at the opposite side of the plow frame is a lever 7 having a lug 8 which projects over that crank of the axle 4 carrying the land wheel 2 to provide a stop for limiting the movement of said crank. The lever 7 may be turned in a well known way by means of a screw adjusting device 9, 10 to adjust the depth of plowing. For raising and lowering the plow bases a power lift mechanism 11 of well known design is provided, said mechanism being operated by means of the operating rod 12.

The parts above described are well known per se and form no part of the present invention.

The adjusting device according to the invention as shown in the drawing is of the following design.

The crank arm 6 on the land wheel axle 4 is pivotally connected with one angle of a triangularly shaped plate 13. Another angle of said plate 13 is connected by a link 14 to a crank arm 15 secured to the furrow wheel axle 5, while the third angle of the plate 13 is connected by a link 16 to one arm of a bell crank lever 17 loosely mounted on the axle 5, the other arm of said bell crank lever being connected to an operating device. Said operating device as illustrated in the drawing comprises a screw adjusting device, including an internally threaded sleeve 18 connected to the lever 17 which is slidable but not rotatable, and a threaded operating shaft 19 engaging the sleeve 18 which is rotatably but not slidably mounted in a standard 20 secured to the plow frame. The operating shaft 19 is provided with an operating crank 21 within easy reach of the operator when sitting on the tractor.

The link system above described which interconnects the axles 4 and 5 is so constructed that in the lifting of the plow bases out of engagement with the ground as well as upon variations of the depth of plowing by means of the respective mechanisms, the resulting raising or lowering of the land wheel relatively to the plow frame will be transmitted to the furrow wheel 3 so as to lower or raise it in the same degree.

If it is desired, on the contrary, to adjust the level of one plow base relatively to the other, that is, to raise or lower the furrow wheel 3 without changing the position of the land wheel 2, the operating shaft 19 is rotated whereby the sleeve 18 will be displaced causing, by means of the lever 17 and the link 16, the plate 13 to turn about its connection with the crank arm 6. This movement of the plate 13 causes the link 14 to turn the crank arm 15 with the axle 5 whereby the furrow wheel 3 will be raised or lowered, whereas the axle 5 with the land wheel 2 will be left unoperated.

Adjustment of one side of the plow base relatively to the other may thus be effected by means of the screw 19 which is always at the same distance from the operator sitting on the tractor, irrespective of the lifting of the plow bases out of engagement with the ground and, likewise, irrespective of variations of the depth of plowing or variations of the level of the plow bases with respect to each other.

What I claim is:

1. In a plow, the combination with a plow frame, separate crank axles mounted therein, and wheels mounted on said crank axles, of a crank arm secured to each of said axles, an angularly shaped lever pivoted to one of said crank arms at one of its angles, a link connection between a second angle of said lever and the crank on the other axle, an adjusting element rockably mounted on the frame, means for adjusting said element, and a link connection between a third angle of said lever and said adjusting element.

2. In a plow, the combination with a plow frame, separate crank axles mounted therein, a land wheel carried by one of said axles, and a furrow wheel carried by the other axle, of a crank arm on each of said axles, a triangularly shaped lever pivoted at one of its angles to the crank arm on the land wheel axle, a link connection between a second angle of said lever and the crank arm on the furrow wheel axle, a bell crank lever rotatably mounted on the furrow wheel axle, a link connection between the third angle of said lever and one end of said bell crank lever, a screw adjusting device, and a connection between the other end of said bell crank lever and said screw adjusting device.

In testimony whereof I have signed my name.

OSCAR ADOLF KRISTIAN PRINTZ.